US007049574B1

(12) United States Patent
Takeuchi

(10) Patent No.: US 7,049,574 B1
(45) Date of Patent: May 23, 2006

(54) GENERATOR FOR PRODUCING PHOTON NUMBER STATE

(75) Inventor: Shigeki Takeuchi, Sapporo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/719,158

(22) PCT Filed: Nov. 10, 1999

(86) PCT No.: PCT/JP99/06244

§ 371 (c)(1),
(2), (4) Date: Dec. 12, 2000

(87) PCT Pub. No.: WO00/62122

PCT Pub. Date: Oct. 19, 2000

(30) Foreign Application Priority Data

Apr. 12, 1999 (JP) .......................................... 11/104600

(51) Int. Cl.
*H01J 40/14* (2006.01)

(52) U.S. Cl. .................................. 250/214 R; 359/330
(58) Field of Classification Search ............. 250/214 R, 250/214.1, 207; 359/330, 341.3; 380/255; 398/40
See application file for complete search history.

(56) References Cited

U.S. PATENT DOCUMENTS 5,675,648 A 10/1997 Townsend 6,307,984 B1 * 10/2001 Watanabe .................... 385/24
6,421,488 B1 * 7/2002 Takeuchi .................... 385/122
6,522,749 B1 * 2/2003 Wang ......................... 380/263

FOREIGN PATENT DOCUMENTS

WO   WO 96/06491   2/1996

OTHER PUBLICATIONS

Jungsang Kim, et al. "Multiphoton Detection Using Visible Light Photon Counter," Applied Physics Letters, American Institute of Physics, vol. 74, No. 7, Feb. 15, 1999, pages 902–904.
P. G. Kwiat, et al., "Absolute Efficiency and Time–Response Measurement of Single–Photon Detectors," Applied Optics, Optical Society of America, vol. 33, No. 10, Apr. 1, 1994, pages 1844–1853.

* cited by examiner

*Primary Examiner*—Thanh X. Luu
*Assistant Examiner*—Seung C. Sohn

(57) ABSTRACT

An apparatus for generating a specified number of photons whose generating time is known, and further an apparatus for generating a specified number of photons in the known schedule are provided. The particularly important specified number is 1 and it is able to be applied to quantum cryptographic communication. The apparatus comprises a photon pair source for generating a photon pair that comprises a signal photon and an idler photon and correlates with the generating time, photon number detectors for detecting the photon number of idler photons, a controller for controlling the gate device in conformity with the information on the photon number form the photon number detector, and a gate device for controlling the emission of the signal photon.

10 Claims, 11 Drawing Sheets

GENERATOR FOR PRODUCING PHOTON NUMBER STATE

TECHNICAL FIELD

The present invention relates to a device for generating a specified number of photons with known generating time, and more specifically, to a device for generating a specified number of photons in a known schedule. The particularly important specified number is 1, which is able to be used for quantum cryptographic communication.

BACKGROUND ART

In the quantum cryptographic communication system, loading each photon with information enables the detection of an unauthorized listener by the quantum mechanical principle. However, if the same information is loaded on two or more photons, the unauthorized listener may utilize a part of these photons and the presence of the unauthorized listener may not be able to be detected. In this way, ideally, a pulse that contains only one photon at maximum must be used. For this kind of pulse, it is popularly practiced to attenuate the light beam from the laser beam source by an attenuator in such a manner that the mean number $\mu$ of photons per pulse becomes about 0.1. By doing this, the probability to contain two or more photons in a pulse can be reduced to 1/100, but the probability to contain one photon in the pulse is also reduced to about 0.1. That is, in case of $\mu=0.1$, transmission is actually carried out only about once per 10 times.

As one example of conventional techniques for improving this kind of process, description will be made on the case stated in the "Key Distribution system and method using Quantum Cryptography" of Japanese Unexamined Patent Publication No. 8-505019 (1996) referring to FIG. 11, which corresponds to FIG. 5 in the embodiment of the said invention. In FIG. 11, numeral 7 denotes a laser that generates pumping light 8 for pumping the nonlinear optical medium 9. In the nonlinear optical crystal 9, a parametric fluorescence pair that causes one photon of the pumping light to stochastically generate two photons is generated. One photon of these (in this case, called the "idler photon 5") is detected by an optical detector and a gate controller 38, and when detected, the gate device 4 is opened to enable the other photon (called the "signal photon 6") to pass. In these conventional techniques, as described in the embodiment of the "Key Distribution system and method using Quantum Cryptography" of Japanese Unexamined Patent Publication No. 8-505019 (1996), for the optical detector, a photo-multiplier tube or a semiconductor avalanche photodiode (hereinafter called "AQ-APD") used under active quenching control was used.

However, if the detector used in the conventional technique is used as a photon detector as it is, when a plurality of photons were incident in a response time of the detector, the detector was unable to detect that a plurality of photons were incident. For example, in AQ-APD, since the amplitude of the pulse becomes constant irrespective of the number of incident photons, it was able to detect that photons were incident but it was unable to obtain the information on the number of incident photons. In addition, when the photo-multiplier tube is used, the quantum efficiency $\eta$ is as low as about 20% at maximum, and the detection efficiency of two photons is extremely low (4%) because the efficiency is equal to the square of $\eta$, and it was unable to detect the incidence of two or more photons.

In the conventional technique, because the use of these detectors was premised, there was no means for judging the number of incident photons.

Consequently, even when a plurality of photons are generated sequentially from a parametric fluorescent pairs within a range of the response time of the detector, the detector opens the gate, causing a problem in that a two-photon-state emerges.

However, on the other hand, it was impossible to generate the "two-photon-state" in which two photons sequentially exist within a range of the response time of the detector.

As described above, because in the conventional technique, the detector was unable to detect the number of incident photons and had no means for judging the number of incident photons, the detector had a drawback in that even if photon pairs were generated sequentially within the response time of the photon detector, it opened the gate and a state in which two or more photons were contained within the response time of the detector was emitted.

Furthermore, in the conventional method, it was unable to accurately generate a plurality of photons in one pulse.

It was also unable to control the timing of photon generation in the pulse.

The present invention was achieved to solve these problems, and it is an object of the present invention to provide a device that can suppress uncorrelated two or more photons from being contained in the response time of the detector, to generate an accurate of correlated photons in one pulse, and to control the timing of photon generation in a pulse.

DISCLOSURE OF INVENTION

A photon number state generating apparatus according to the present invention comprises a photon pair source for generating a pair of photons correlated in generating time consisting of a signal photon and an idler photon, a photon number detector for detecting the number of photons of the idler photon, a controller for controlling a gate device in conformity with the information on the number of photons from the photon number detector, and a gate device for controlling an emission of the signal photon.

For a photon pair source for generating a pair of photons, a pumping light source and a nonlinear optical medium on which the pumping light from the pumping light source is incident are provided.

For the nonlinear optical medium on which the pumping light is incident, a nonlinear optical crystal is provided, in which the angle made by the pumping light and the optical axis of the nonlinear optical medium is set to the angle at which tuning curves come in contact with a straight line that corresponds to a specific single wavelength a.

For the nonlinear optical medium on which the pumping light is incident, a nonlinear optical crystal is provided, in which the angle made by the pumping light and the optical axis of the nonlinear optical medium is set to an angle at which the tuning curves come in contact with respective straight lines that corresponds to two specific wavelengths a and b.

In addition, for a nonlinear optical medium on which the pumping light is incident, a waveguide channel type nonlinear optical medium is provided.

Furthermore, for a nonlinear optical medium on which the pumping light is incident, pseudophase matching type nonlinear optical medium is provided.

Still in addition, a pulse height discriminator for discriminating a information on the photon number of a specified range from the photon number detector is provided.

In addition, a photon number detector for outputting signals with the output pulse height varied in accordance with the number of incident photons is provided, and for the controller, a pulse height discriminator for discriminating the output pulses with a specified pulse height range from the photon number detector is provided.

Furthermore, a pulse height discriminator is provided, in which the information on the photon number from the photon number detector separates the case in which the number of photons that are incident on the photon number detector is one.

Furthermore, a pulse height discriminator for discriminating the height of output pulse from the photon number detector that corresponds to the height when the number of photon incident on the photon number detector is one is provided.

Furthermore, a clock generator and a gate operation frequency judging section for operating the gate device only in a number of times less than a specific number of times within a predetermined time defined by the clock are equipped for the controller.

In addition, a clock generator and a gate operation frequency judging section for operating the gate device only in response to the first signal from the photon number detector within a predetermined time defined by the clock are equipped for the controller.

In addition, for a gate device for controlling the emission of the signal photon, a plurality of shutters for closing or opening in a time difference shorter than the gate opening or closing time are equipped.

In addition, an optical fiber for allowing the signal photon generated from the photon pair to reach the gate device for controlling the emission of the photon is equipped.

In the present invention, of the photon pair comprising a signal photon and idler photon which are generated in the photon sources and correlate with the generated time, by detecting the number of idler photons by a photon number detector, and controlling the gate device in conformity with the information on the number of photons from the photon number detector, the number of photons contained in the signal photon is controlled.

In addition, the pumping light from the pumping light source is allowed to be incident and a photon pair which are generated by the nonlinear optical medium and correlate with the generation time is used as an idler photon and a signal photon.

In addition, in installing the nonlinear optical medium on which the pumping light is incident, the angle made by the pumping light and the optical axis of the nonlinear optical medium is set to an angle in which the tuning curve comes in contact with a straight line that corresponds to a specific single wavelength a.

In addition, in installing the nonlinear optical medium on which the pumping light is incident, the angle made by the pumping light and the optical axis of the nonlinear optical medium is set to an angle in which the tuning curve comes in contact with a straight line that corresponds to two specific wavelengths a and b.

In addition, the pumping light is allowed to be incident to the wave guiding channel type nonlinear optical medium.

In addition, the pumping light is allowed to be incident to the pseudo phase matching type nonlinear optical medium.

In addition, the information on the number of photons from the photon number detector which is within a specified range is separated at the pulse height discriminator of the controller.

In addition, the signal from the photon number detector for outputting signals that vary the output pulse height in conformity with the number of incident photons having a specified range of output pulse height is separated by a pulse height discriminator equipped for the controller.

In addition, the information of the number of photons from the photon number detector is separated when the number of photons incident on the photon number detector is one.

In addition, the height of output pulse from the photon number detector which corresponds to the height when the number of photons incident on the photon number detector is one is separated.

In addition, the gate device is operated only in the number of times that is less than a specified number of times within a predetermined time defined by the clock from the clock generator of the controller.

In addition, the gate device is operated only in response to the first signal from the photon number detector within a predetermined time defined by the clock from the clock generator of the controller.

In addition, a gate device for detecting incidence of idler photons by the photon detector and controlling the emission of signal photons in the number of times less than the specific number of times within a specified time defined by the clock from the clock generator.

The emission of signal photons is controlled by a plurality of shutters that open or close in a shorter time difference than the open or close time.

In addition, the signal photon generated from the photon pair is allowed to reach the gate device that controls emission of the photon by the use of optical fiber.

BEST MODE FOR CARRYING OUT THE INVENTION

Embodiment 1

Figure 1:
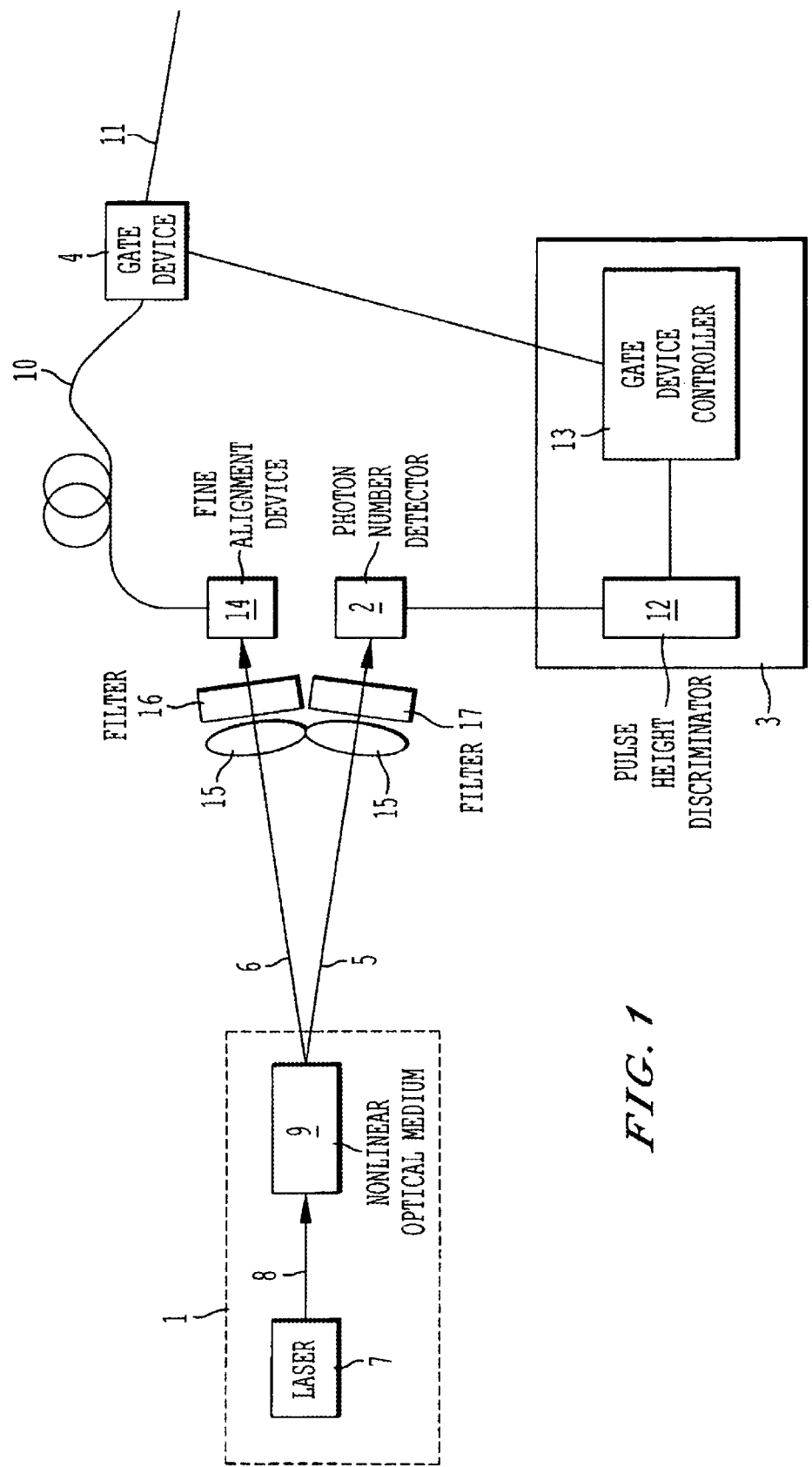
FIG. 1 is a general arrangement drawing of one embodiment according to the present invention.

FIG. 1 is a general arrangement drawing of one embodiment of the invention. In this embodiment, it is a device in which a single photon state is generated and two photons do not densely exist within the resolution time τ of the detector.
(Description on Configuration)

In FIG. 1, numeral 1 denotes a photon pair source that generates a photon pair that correlate with the generation time, numeral 2 denotes a photon number detector for detecting an idler photon 5, and numeral 3 denotes a controller for controlling a gate device 4 in response to the information on the number of photons from the photon number detector. The gate device 4 controls the emission of a signal photon 6. The photon pair source 1 comprises a nonlinear optical medium 9 and a pumping light source 7 of a pumping light 8 that pumps the nonlinear optical medium. The idler photon 5 generated in the nonlinear optical medium 9 is converged to the photon number detector 2 via a filter 17 that allows the object idler photon to selectively penetrate by a lens 15. From the photon number detector 2, pulses of different height are outputted in accordance with the number of photons incident in one time. Only when the pulse height is that when the number of incident photon is one photon, the pulse height discriminator 12 triggers the gate device controller 13, and the trigger causes the gate device controller 13 to open the gate device 4 for a predetermined time.

On the other hand, the signal photon 6 is focused by the lens 15, and is converged into an optical fiber 10 while passing a filter 16 for selectively penetrating 2 λ-wavelength photons of a signal light. Numeral 14 is an fine alignment device for allowing the light from the outside to be efficiently incident on the optical fiber. The optical fiber 10 is used to delay the signal photon 6 to reach the gate device 4 for the time required from the incidence of the idler photon 5 on the detector to the start of control of the gate device 4 in the procedure as described above.
(Description on photon pair generator)

In the nonlinear optical medium 9, the idler photon 5 and the signal photon 6 that have wavelength 2 λ double the wavelength A of pumping light 8 are generated by down conversion. In this embodiment, argon laser that has 351.1 nm wavelength is used for the pumping light source 7. In this event, the idler photon 5 and the signal photon 6 are generated as a pair, the sum of whose energies generated is equal to the energy of the photon of 351.1 nm wavelength, that is, a photon of 702.2 nm wavelength, respectively.

Figure 2:
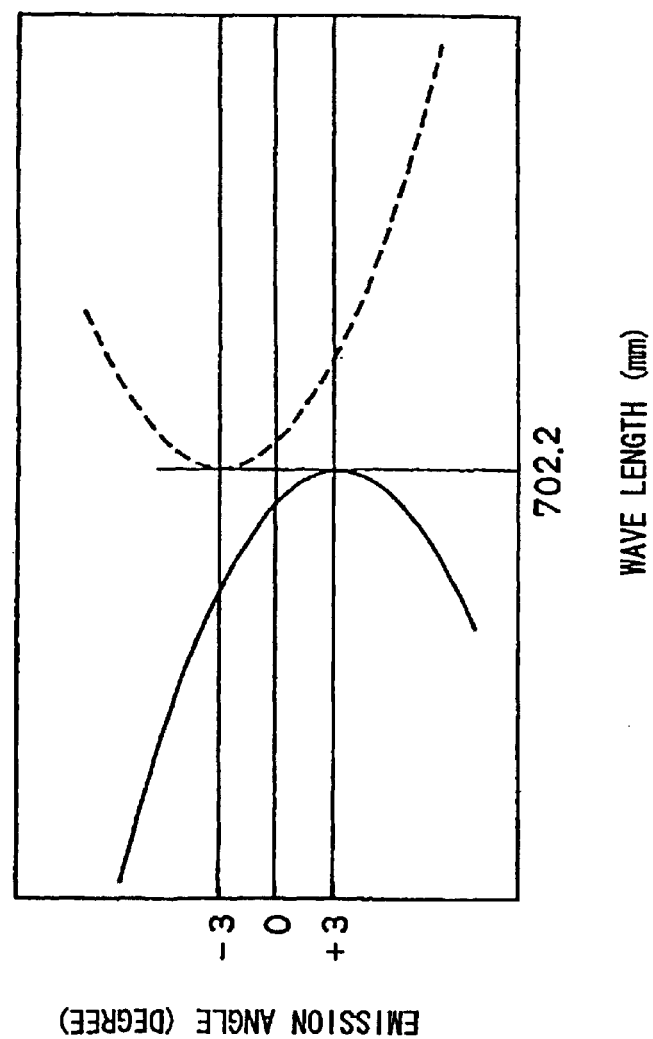
FIG. 2 is a drawing showing the relationship between the wave length and emission angle of photons generated in the nonlinear optical medium.

As described in detail in the Japanese Patent Application No. 9-353078 (1997) "Photon Beam Generator," setting the optical axis of the nonlinear optical medium to a specific angle with respect to the pumping light enables the idler photon 5 and signal photon 6 to be generated in a form of beam as well as in a high efficiency. FIG. 2 shows a tuning curve when the optical axis of β-Barium-Boron-Oxide (BBO) crystal is set to the angle of 50.4° with respect to the pumping light. In FIG. 2, the wavelength of the photon generated is taken as abscissa and the emitting direction of the photon with respect to the incident direction of the pumping light is taken as ordinate. As seen in the figure, two tuning curves come in contact with a straight line that corresponds to the 702.2 nm wavelength. Under this condition, a 702.2-nm wavelength fluorescent pair are emitted in a form of beam in directions of plus 3° and minus 3°, respectively. By using this kind of nonlinear optical medium, a photon pair is generated efficiently with respect to the incident power of the pumping light, and as a result, in case the single photon is generated at an equivalent rate, it is possible to suppress the power consumption of the equipment to a low level.

In this case, a parametric fluorescent pair was used as a method for generating a photon pair that correlates with the generating time, but needless to say, it is possible to generate a photon pair by any other methods. For example, it is possible to use a cascade emission process from the excited state, etc.
(Description on Photon Number Detector)

In this embodiment, a Visual Light Photon Counter (hereinafter called VLPC) developed by Boeing is used as a photon number detector. This VLPC is able to detect how many photons are incident at a high quantum efficiency as described in detail in the paper titled "Multi-photon Counting using Visible Light Photon Counter" by Jungsang Kim, Shigeki Takeuchi, Yoshihisa Yamamoto, and Henry H. Hogue published in the Feb. 15, 1999 issue of Applied Physics Letters.

Figure 3:
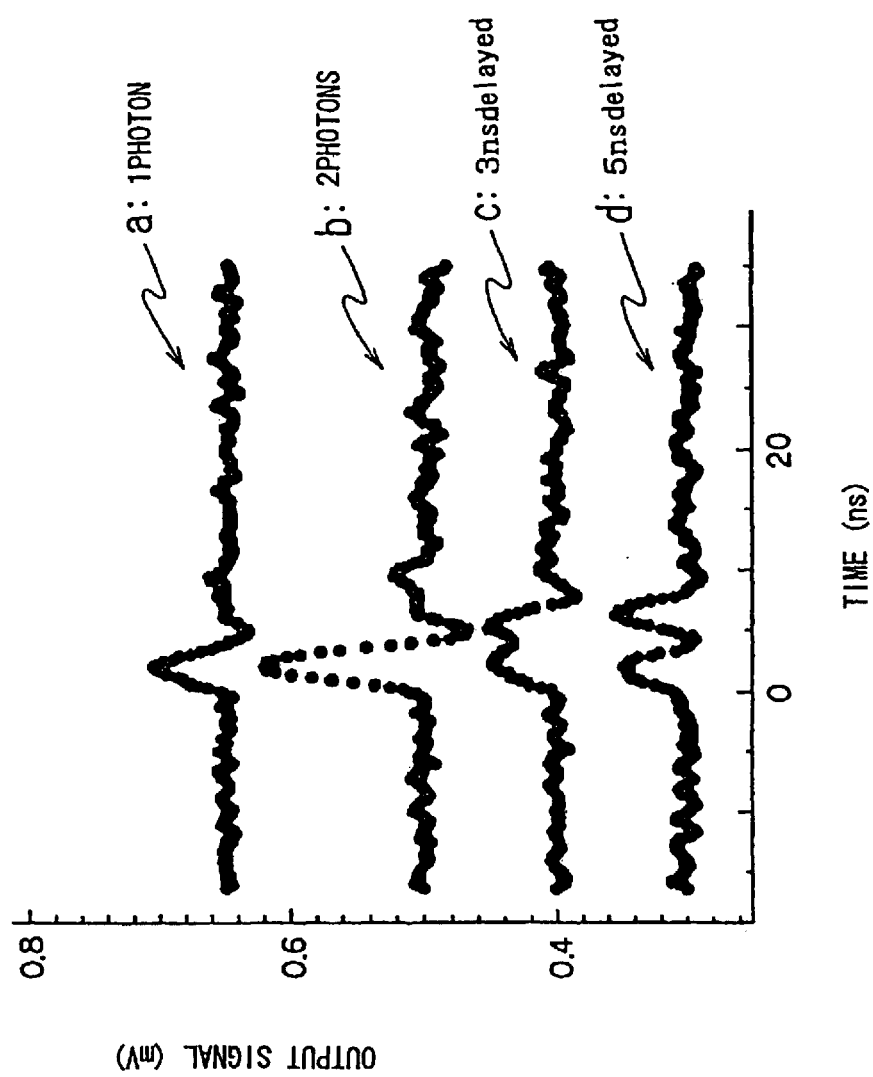
FIG. 3 is a drawing showing the relationship between the incident photon (photons) and the output signal of the photon number detector used in one embodiment of the invention.

Referring now to FIG. 3, the operation when a plurality of photons are incident on the detector is explained. In FIG. 3, the abscissa is the time and the ordinate the height (pulse height) of output pulse from VLPC. The graph also shows the output pulse (a) when only one photon is incident, (b) when two photons are incident simultaneously, (c) two photons are incident at intervals of 3 ns, and (d) two photons are incident at intervals of 5 ns, respectively, from top to bottom. As described above, when two photons are incident simultaneously, the pulse height becomes about double that when one photon is incident.

Figure 4:
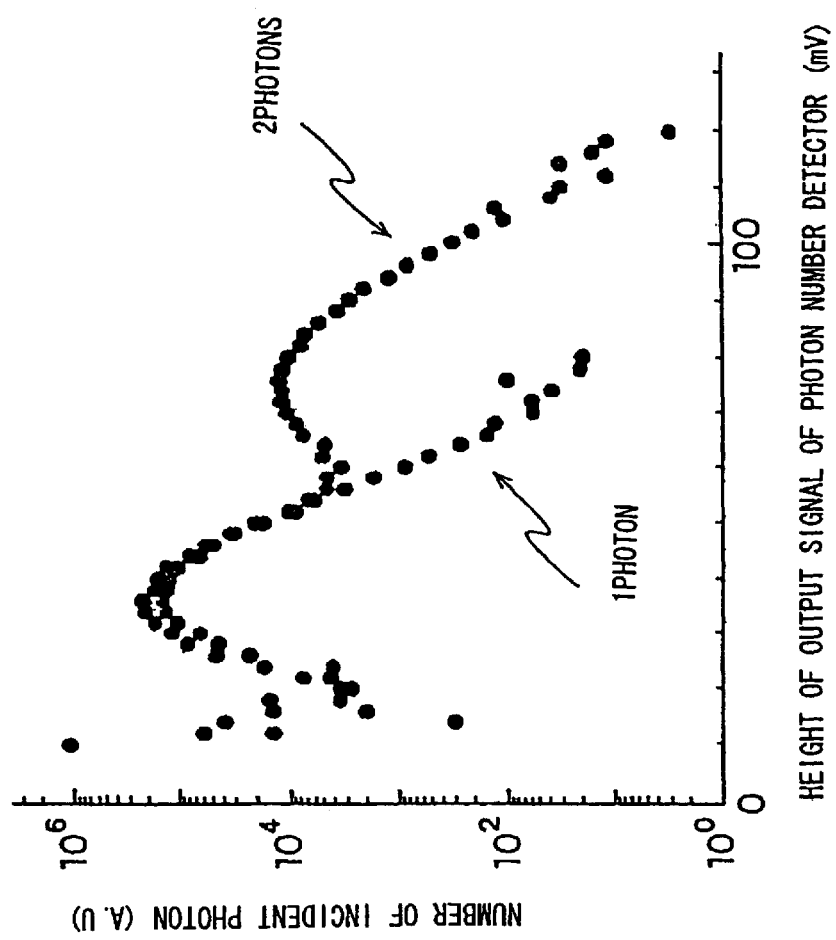
FIG. 4 is a drawing showing the relationship between the number of incident photons and height of the output signal of the photon number detector used in one embodiment of the invention.

FIG. 4 shows the results of investigating the distributions of pulse height when the number of photons incident on the detector is one photon and when it is two photons, respectively. The two-photon incidence was carried out using a parametric fluorescent pair, but since there is a problem of optical adjustment, both photons of the photon pair are not always able to be incident on VLPC for all of the photon pairs generated. In the graph, the portion of 10 mV or less is noise, and the peak centered around 37 mV corresponds to the one-photon detection and the peak centered around 74 mV corresponds to the two photon detection. By the way, VLPC outputs detection pulses of a height nearly proportional to the number of photons because of its structure, when two or more photons are incident.
(Specific Configuration and Description of Controller)

The assessment with optical adjustment problems, etc. corrected indicates that the probability to judge "one photon" in spite of the two-photon incidence was about 35% when the quantum efficiency to one-photon incidence of a photon number detector using VLPC is 75% when only the range from 10 mV to 56 mV of the pulse height from the detector is judged "one-photon detection." In the pulse height discriminator 12, the gate device controller is triggered only when this kind of signals of pulse height are input from the photon number detector using a pulse height analyzer. In response to the triggering operation, the gate device is opened or closed. The time in which the gate device is open is desirably the resolution time of the detector, and preferably between 2 ns and 5 ns in the present embodiment.

The probability of misjudging the two photons as one photon can be further improved by improving the quantum efficiency of the photon number detector using VLPC. In this kind of detector, as stated in "High Quantum-efficiency Single-photon Counting System" by Shigeki Takeuchi, Jungsang Kim, Yoshihisa Yamamoto, and Henry H. Hogue published in the Feb. 22, 1999 issue of Applied Physics Letters, the quantum efficiency is able to be improved nearly to 90%, and in such a case, the probability to misjudging two photons as one photon can be suppressed to 18% or less.

By using this kind of detector, the phenomenon in that "a plurality of photons are generated sequentially from a parametric fluorescent pair within around response time of the detector, open the gate and the two-photon-state is emitted" in the conventional technique was able to be reduced to one fifth or less. In addition, because in the conventional technique, in order to avoid two-photon emission, the average number of photons per one pulse was made small (for example, 0.1), when this technique was adopted to communication, the transmission efficiency was reduced to the same ratio, but according to the present embodiment, an average of one photon is able to be emitted per one pulse, and the transmission efficiency is able to be improved.

Embodiment 2

In Embodiment 1, the wavelength of signal beam generated was 702.2 nm, but needless to say, this wavelength is able to optionally changed by selecting a suitable pumping light source laser and nonlinear optical medium. For example, it is naturally possible to generate wavelengths in the vicinity of 1550 nm, vicinity of 1310 nm, and in the vicinity of 800 nm, which are generally adopted to communication using optical fiber.

The method for generating a photon pair shown in Embodiment 1 (FIG. 2) is a method suited to obtain a photon pair beam with equal wavelengths and small angular dispersion, but it is possible to obtain a photon pair with different wavelengths by changing the optical axis direction of the BBO crystal for other object of use. In such event, the two tuning curves of FIG. 2 come in contact with straight lines that correspond to different wavelengths, respectively. In such event as well, the photons are taken out at an angle in which the tuning curves shown in FIG. 2 come in contact with the straight lines that correspond to the relevant wavelengths. According to this condition, photons that generally disperse in a form of cone are converged into one beam and the photon beam with high distribution density is able to be obtained.

For other embodiments of the invention, there is a device for generating the 532-nm pumping light 8 using an up-conversion laser of a semiconductor excited Yag laser as a pumping light source 7 in FIG. 1, and generating a 1310-nm photon as a signal photon 6 and a 896-nm photon as an idler photon 5. In such event, by the method described in detail in the Japanese Patent Application No. 9-353078 (1997) "Photon Beam Generator," the angle made by the optical axis of the nonlinear optical medium is set to such an angle that the tuning curve comes in contact at 1310 nm and 896 nm, respectively, in order to improve the photon pair generating efficiency. In addition, by setting the wavelength of the idler photon to a near infrared area close to the wavelength of visible light, the number of photons is able to be detected with the quantum efficiency of the photon number detector 2 set to a high level.

With this kind of configuration, it is able to generate photons in the vicinity of 1310 nm with a small transmission loss in the optical fiber in such a manner as to prevent two photons within the resolution time τ of the detector from existing densely. In the present embodiment, it becomes possible to efficiently generate the photon pair by establishing the crystal angles as described above, and it becomes also possible to maintain the high detection efficiency of the number of idler photons, and as a result, the power consumption of the device is able to be reduced.

Embodiment 3

Figure 5:
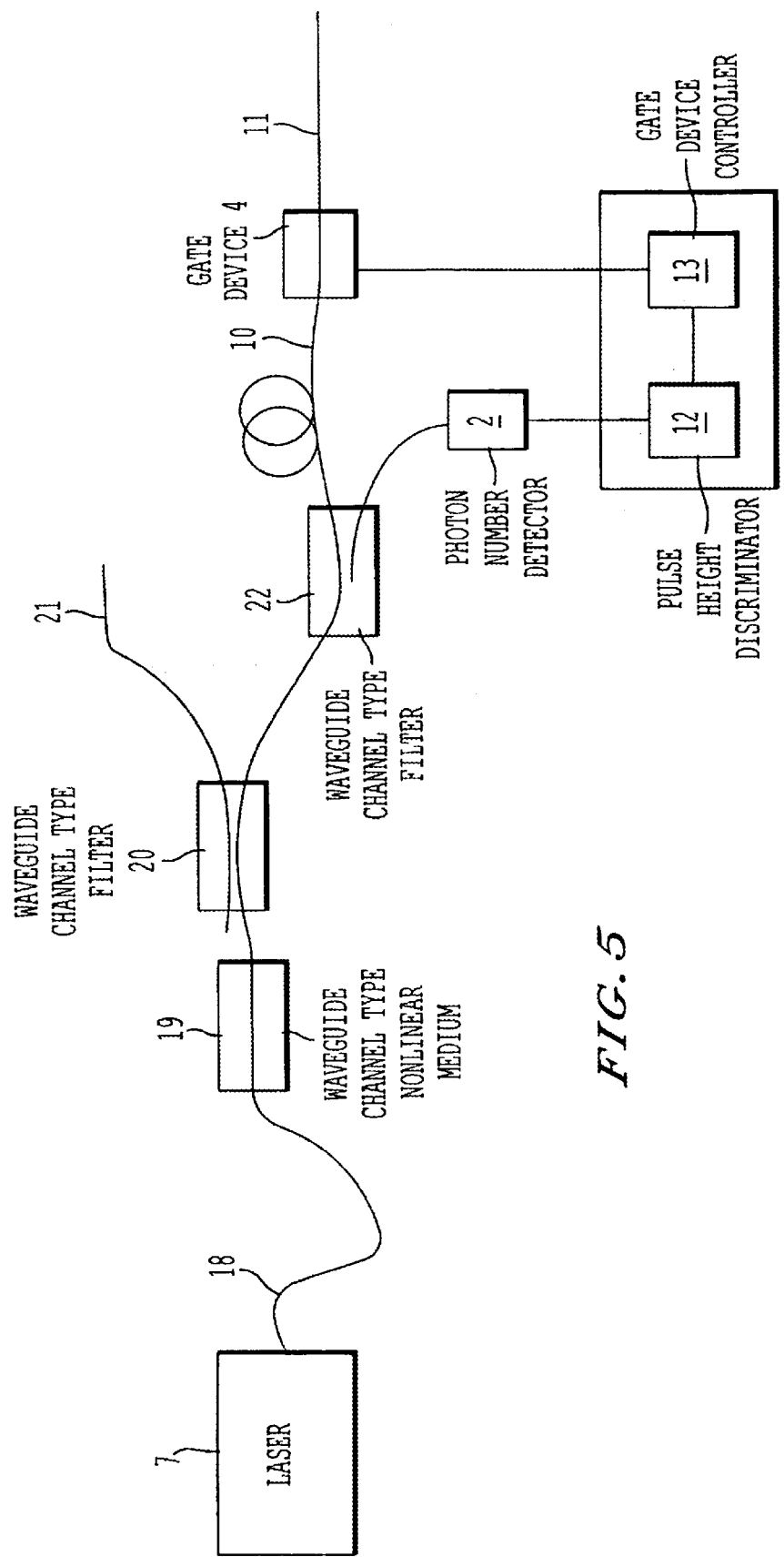
FIG. 5 is a general arrangement drawing of one embodiment of the invention.

FIG. 5 shows another embodiment of the invention. In this embodiment, numeral 7 is a pumping light source, numeral 18 an optical fiber for guiding the pumping light, numeral 19 a waveguide channel type nonlinear medium, numeral 20 a waveguide channel type filter for discriminating the fluorescent pair and pumping lights generated from the waveguide channel type nonlinear optical medium 19, numeral 21 an emission port of pumping light, and numeral 22 a waveguide channel type filter for dividing the fluorescent pair into two branches.

In this embodiment, the parametric fluorescent pair is generated in the waveguide channel type nonlinear optical medium 19. The fluorescent pair has vertical and horizontal polarized lights, respectively, and in the waveguide type filter 22 that operates as a polarizing beam splitter, that with one of the polarized light pair is transmitted to the photon number detector 2 and another to the optical fiber 10.

By this kind of configuration, it becomes possible to downsize the device, and optical alignment is no longer required.

In this kind of embodiment, as the nonlinear optical medium, a waveguide channel type nonlinear optical medium 19 is used. As described by "two photon correlation phenomenon by optical waveguide channel type nonlinear type element" written by Sanaka et al. in Page 321, the second separate volume, No. 2, Volume 53 of the Proceedings of the Japanese Society of Physics, in the pseudo phase matching type waveguide channel nonlinear medium, a nonlinearity that can satisfy a conditions in which the pumping light used and the photons generated are generated in parallel can be obtained by pseudo phase matching.

With this, wavelengths of pumping light and generated photon are able to optionally chosen.

Embodiment 4

Figure 6:
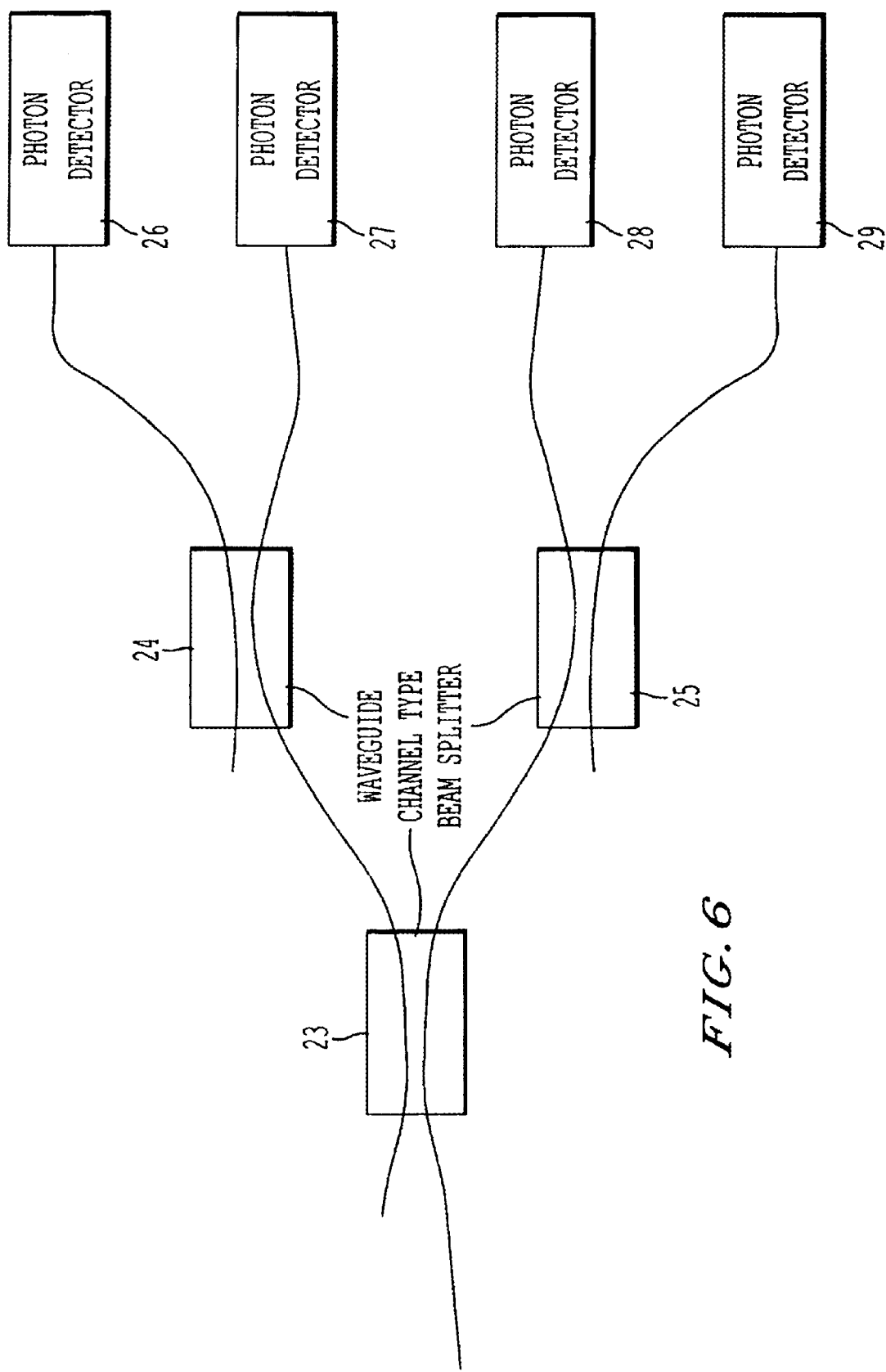
FIG. 6 is an arrangement drawing of a photon number detector used in one embodiment of the invention.

For other embodiment of the invention, FIG. 6 shows a case when a photon number detector in Embodiment 1 shown in FIGS. 3 and 4 is configured by combining a plurality of photon detectors. In FIG. 6, numerals 23, 24, and 25 are waveguide channel type beam splitters with a split ratio of 50:50, and numerals 26 through 29 are photon detectors. For the photon detectors 26 through 29, detectors that can detect incidence of photons but are unable to distinguish the incident photon number may be used. For example, SPCM (Single Photon Counting Module)-AQ commercially available from Seiko EG&G which drives the incident photon number avalanche photo-diode by a Geiger mode may be used.

The photon that is propagated through optical fibers are incident on photon detectors 26 through 29 at a probability of one in four, respectively, while it passes through beam splitters 23 through 25. Consequently, for example, when two photons are incident within the response time of the detectors, two detectors respond at the probability of three in four and can distinguish them as two photons.

The detection signals from detectors 26 through 29 may be transmitted to the pulse height discriminator 12 of FIG. 3 as parallel signals as they are or may be compressed in a suitable form and transmitted as serial signals. In addition, it is also possible to integrate the photon number detector with the pulse height discriminator 12 by incorporating a logic circuit at the subsequent stage of each detector.

In the present embodiment, for one example, a case to use four detectors in parallel was shown, but an optional number of detectors may be used. In general, when N pieces of detectors are used in parallel and beam splitters are installed in such a manner that photons are incident on these detectors at an equal probability, the detection probability of two photon incidence is given by (N-1)/N.

In the present embodiment, for beam splitters 23 through 25, 50:50 beam splitters are used, but beam splitters of suitable split ratio may be used in accordance with the quantum efficiency, etc. of each detector.

As a method for receiving photons with a plurality of detectors installed in parallel, a method for using a beam splitter to divide the light path into a plurality of light paths is adopted, but for example, when the beam receiving surfaces are able to be installed adjacent to each other, lenses, etc. may be used to enable a plurality of these photon detectors to detect photons at a uniform detection ratio, respectively.

Embodiment 5

For still another embodiment of the invention, in the pulse height discriminator 12 of FIG. 1, it is possible to cut out the component only that corresponds to the case when two photons are incident from the detection signals from the photon number detector. In such event, from the gate, the state in which two photons are contained within the response time of the detector is emitted. Needless to say, it is possible to cut out optional combinations such as the state of N photons or the state of even number of photons in the similar manner.

Embodiment 6

Figure 7:
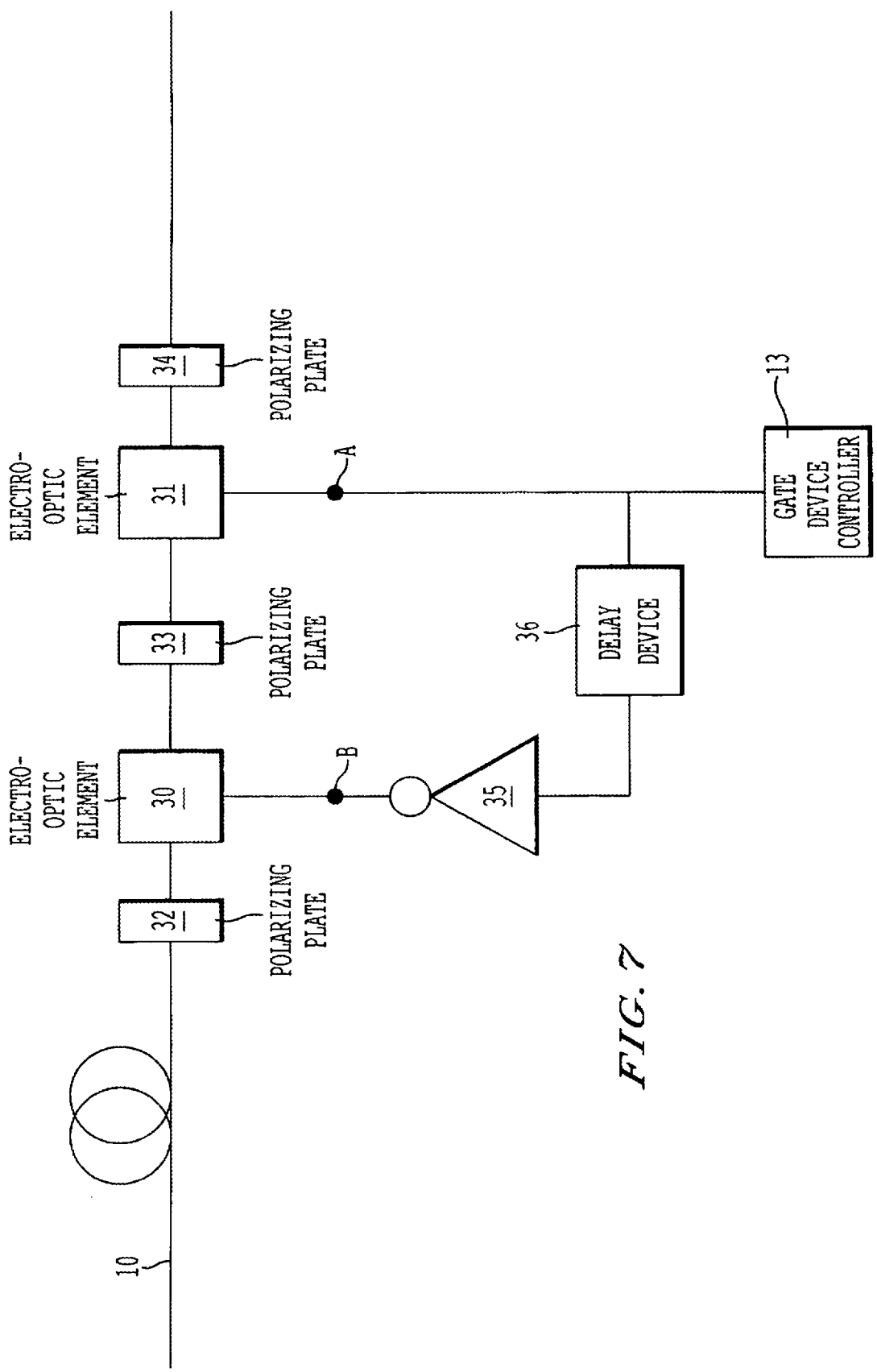
FIG. 7 is an arrangement drawing of a gate device used in one embodiment of the invention.

For yet another embodiment of the invention, FIG. 7 shows the case in which two shutters are equipped for the gate device 4 of FIG. 1. In FIG. 7, numeral 10 denotes an optical fiber for delaying the signal photon in the reaching time to the gate device, numerals 30, 31 denote electro-optic elements, numerals 32, 33, 34 denote polarizing plates, numeral 35 denotes a NOT gate, numeral 36 denotes a delay device, and numeral 13 denotes a controller. In this event, polarizing plates 33 and 34 are set in such a manner that they have the maximum transparency for the polarization of the light that has passed the polarizing plate 32 and do not transmit the light which has polarization crossing at right angles to said light. In addition, the electro-optic elements 30, 31 rotate the polarization angle by 90° when the logic of the control signal is 1 and does not rotate the polarization when the logic is 0.

The gate device preferably holds the gate open condition only while the photon is present, and is closed during other periods. However, with a single electro-optic element, the gate time was unable to be set to the time less than that specified by the repetitive response time of the electro-optic element. The present embodiment has achieved the gate operation shorter than the repetitive response time of the shutter by installing two shutters.

Figure 8:
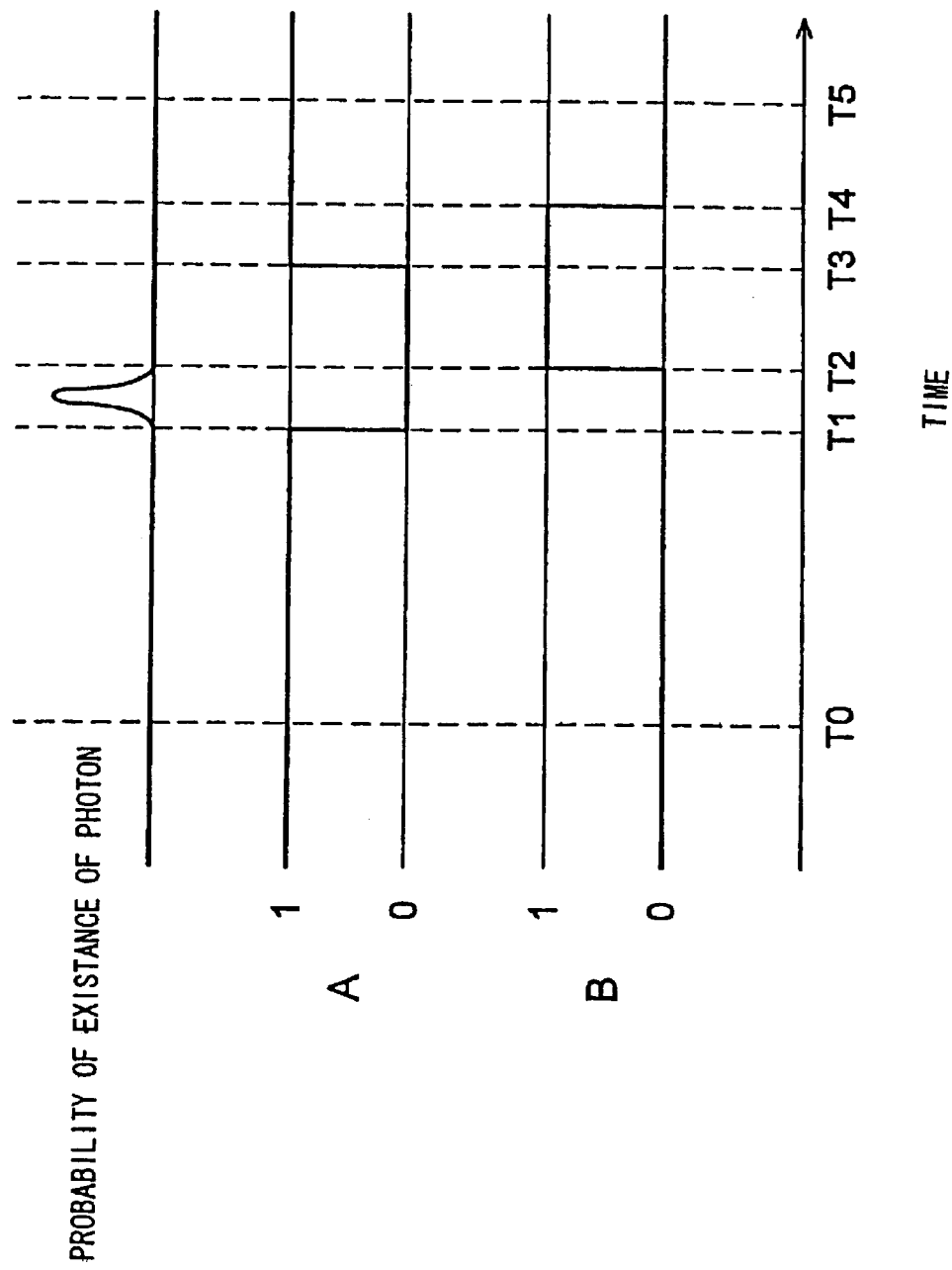
FIG. 8 is an schematic drawing for explaining operation of the gate device used in one embodiment of the invention.

Referring now to FIG. 8, operation of the gate circuit is described. In FIG. 8, time is plotted in abscissa. The graph at the top indicates the probability in which the desired photon number state reaches the gate operating section, Graph A the signal at point A of FIG. 7, and Graph B the state of signal at point B of FIG. 7 in the similar manner. Denotation A may be considered as the control signal itself from the controller. The electro-optical element 31 transmits the photon when the logic 0 is entered and shields the photon when the logic 1 is entered in combinations with polarization rotators 33, 34.

The electro-optic element 30 operates in the same way in combinations with polarizers 32, 33.

As in the state at time T0 of graph A of FIG. 8, the control signal from the controller is usually set 1. In this case, the gate device does not transmit the photon by the electro-optical element 31. In this event, to the electro-optical element 30, logic 0 is entered by the NOT gate 35, and photon is allowed to be transmitted.

The controller 13 changes the output logic from 1 to 0 so that the electro-optic element 31 opens at the time T1 right before the time when the photon is expected to reach the gate operating section. In this event, by the operation of the delay unit 36, the electro-optical element 30 is kept to logic 0. In such event, the photon is ready to penetrate the gate device. This state continues for the time set by the delay unit. After the delay, at T2, the logic to the electro-optic element flips to 1 and the photon is unable to penetrate the portion of electro-optic element 30. At time T3, the control signal again changes from 0 to 1, causing the electro-optic element 31 to change to closed state, and at T4, it returns to initial state.

By the above-mentioned configuration, it is possible to open the gate device only for the time shorter than the response time of individual electro-optic element, rendering itself capable for selectively emitting the required photons only.

Embodiment 7

Figure 9:
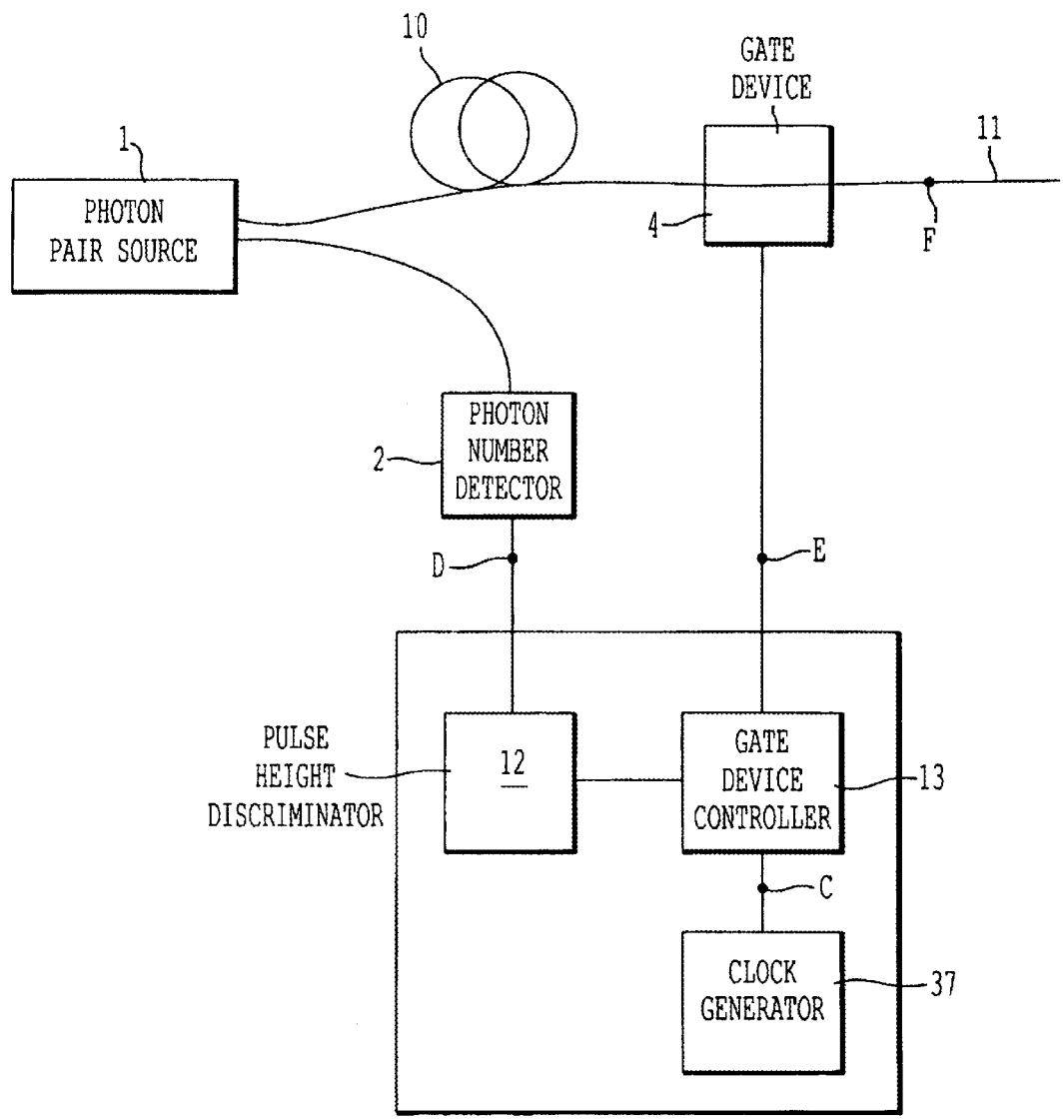
FIG. 9 is a general arrangement drawing of one embodiment of the invention.
Figure 10:
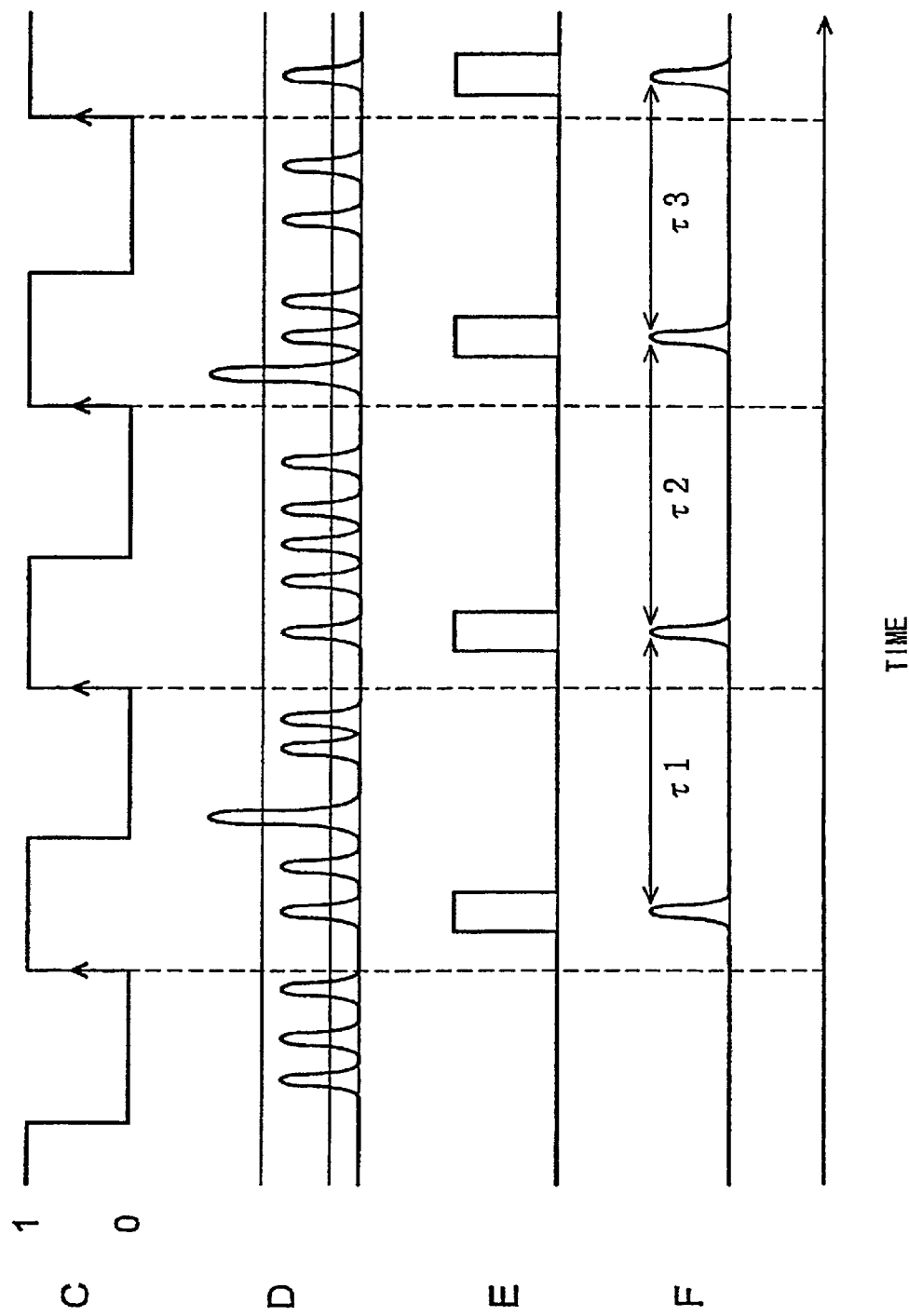
FIG. 10 is an schematic drawing for explaining the operation of one embodiment of the invention.
Figure 11:
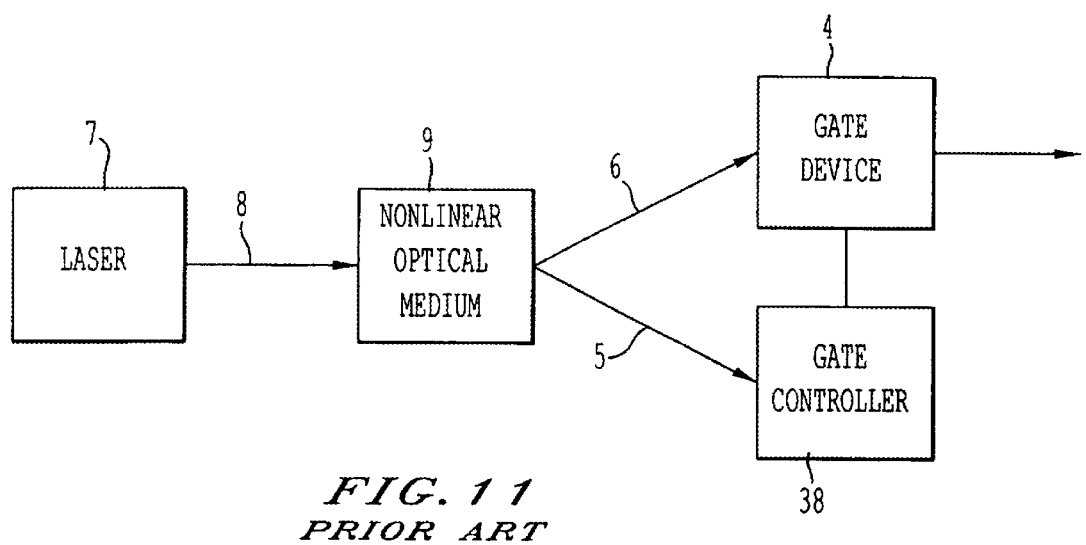
FIG. 11 is a general arrangement drawing of one example of conventional techniques.

FIG. 9 shows further embodiment of the invention. In FIG. 9, numeral 37 is a clock generator for generating a clock signal supplied to the controller. Referring now to FIG. 10, the operation of this embodiment will be described. In FIG. 10, the time is plotted in abscissa. Graph C is a clock signal observed at point C of FIG. 9, Graph D is signal from the photon number detector 12 observed at point D of FIG. 9, Graph E is a gate control signal from the controller 13, and Graph F is the photon distribution observed in the optical fiber 11 after photon passed the gate device 4.

As seen in Graph D, from the photon number detector 2, signals with pulse height corresponding to the number of incident photons at that time are constantly outputted. The pulse height discriminator 12 chooses the pulse height corresponding to the photon incidence of one at a time. In the controller 13, the gate device 4 is opened only against the signal from the pulse height discriminator which is first entered after the clock rise-up (Graph E). As a result, from the optical fiber 11, a single photon is emitted at nearly uniform intervals as seen in Graph F.

In this embodiment, the pulse height discriminator 12 chooses only the state in which only one photon is present within the response time of the photon number detector 2, but needless to say, it is possible to choose a state corresponding to two or more photons. By this, it becomes possible to generate a multiple photon number state at intervals close to uniform intervals. If the number of generated photon pairs is increased, the intervals are able to be further brought to uniform intervals.

Embodiment 8

In Embodiment 7, the gate device was opened only once within specified time intervals, but may be opened N times within the specified time intervals. By doing this, it is possible to create a state in which N photons are contained within a specified time. Even in such a case, it becomes possible to create a state in which N photons are repeatedly generated more uniform intervals by increasing the number of generated photon pairs.

As described above, in the photon number state generating apparatus according to the present invention, an optional photon number state is able to be generated irrespective of the response speed of the detector by equipping a photon pair source for generating photon pairs that correlate with the generating time, photon number detector for detecting one photon of the pair, and a controller for controlling the gate device in conformity with the information of the number of photons from the photon number detector.

It is also possible to efficiently generate an optional photon number state by equipping a pumping light source and a nonlinear optical medium on which the pumping light is incident from the pumping light source, as a photon pair source.

It is still possible to efficiently generate the photon number state by properly adjusting the nonlinear optical element.

It is also possible to eliminate optical alignment and achieve easy handling by equipping the waveguide channel type nonlinear optical medium for the nonlinear optical medium.

In addition, it is possible to generate a photon number state at specified time intervals by equipping, for the controller, a clock generator and a gate operating frequency judging section for operating the gate only in the number of times less than the specific number of times within a predetermined time defined by the clock.

Furthermore, it is possible to achieve a gate at a time extremely shorter than the repetitive frequency of the shutter itself by equipping, for the gate device, a plurality of shutters that open or close at a time difference shorter than the gate open or close time.

INDUSTRIAL APPLICABILITY

A photon number state generating apparatus according to the present invention is able to generate an optional photon number state irrespective of the response speed of the detector by equipping a photon pair source for generating a photon pair that correlated with the generating time, photon number detectors for detecting one photon of the photon pair, and a controller for controlling the gate device in conformity with the information of the number of photons from the photon number detector, and it is useful as an apparatus for generating a specified number of photons whose generating time is known.

What is claimed is:

1. A photon number state generating apparatus comprising:
    a photon pair source for generating a pair of photons consisting of a signal photon and an idler photon which are corrected in time of generation each other;
    a photon number detector for detecting a number of the idler photons;
    a gate device for controlling an emission of the signal photons;
    a controller for controlling the gate device in response to a photon number information from the photon number detector,
    a pulse height discriminator equipped in the controller for discriminating a photon number information having photon number within a specified range, wherein the controller controls the gate device in response to the photon number information from the photon number detector;
    wherein said controller comprises:
        a clock generator; and
        a gate operation frequency judging section for controlling the gate device to be opened or closed for less than a specified number of times within a predetermined time defined by a clock signal of the clock generator.

2. The photon number state generating apparatus of claim 1, wherein said photon pair source comprises:
    a pumping light source;
    a nonlinear optical medium on which a pumping light from the pumping light source is incident.

3. The photon number state generating apparatus of claim 2 comprising:
    a nonlinear optical crystal in which an angle between the pumping light and an optical axis of the nonlinear optical medium is set to an angle at which tuning curves come in contact with a straight line corresponding to a single specific wavelength a.

4. The photon number state generating apparatus of claim 2 comprising:
    a nonlinear optical crystal in which an angle between the pumping light and an optical axis of the nonlinear optical medium is set to an angle at which tuning curves come in contact with two straight lines corresponding to two specific wavelength a and b.

5. The photon number state generating apparatus of claim 2, wherein said nonlinear optical medium on which the pumping light is incident comprises a waveguide channel type nonlinear optical medium.

6. The photon number state generating apparatus of claim 2, wherein the nonlinear optical medium on which the pumping light is incident comprises a pseudophase matching type nonlinear optical medium.

7. The photon number state generating apparatus of claim 1 further comprising:
    an optical fiber for allowing the idler photon to reach the gate device for controlling an emission of the photon.

8. The photon number state generating apparatus of claim, further comprising:
    a waveguide channel filter positioned between the photon pair source and photons number generator configured to polarizingly beam split the pair of photons.

9. The photon state generating apparatus of claim 1, wherein the photon number detector comprises plural photon detector elements.

10. The photon number state generating apparatus of claim 1, wherein the gate device comprises two shutters.

* * * * *